United States Patent [19]

Yama et al.

[11] 4,188,074

[45] Feb. 12, 1980

[54] HYDRAULIC ANTI-SKID DEVICE

[75] Inventors: Toshio Yama; Kazuaki Shimizu, both of Fujisawa, Japan

[73] Assignee: Nissan Motor Company, Limited, Yokohama, Japan

[21] Appl. No.: 826,671

[22] Filed: Aug. 22, 1977

[30] Foreign Application Priority Data

Aug. 23, 1976 [JP] Japan .................. 51-100372

[51] Int. Cl.$^2$ ........................................... B60T 17/18
[52] U.S. Cl. ............................................... 303/92
[58] Field of Search ............ 188/181 A; 303/92, 113, 303/115, 116, 119

[56] References Cited

U.S. PATENT DOCUMENTS

| | | | |
|---|---|---|---|
| 3,722,960 | 3/1973 | Von Lowis | 303/92 |
| 3,871,717 | 3/1975 | Jensen | 303/92 |

*Primary Examiner*—Duane A. Reger

[57] ABSTRACT

Locking means locks an expansion valve in a position in which the expansion valve provides communication between the master cylinder and a brake unit when hydraulic fluid pressure is not generated by a pump so that a bypass valve and a differential valve can be omitted and air can be purged without providing an air bleed device.

2 Claims, 2 Drawing Figures

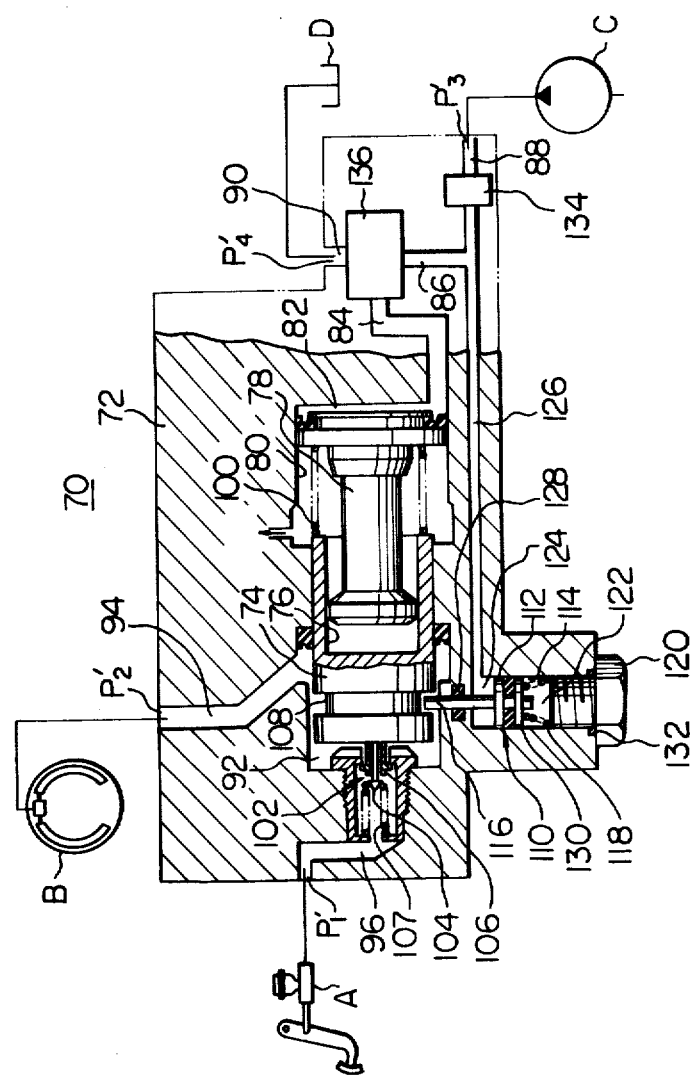

HYDRAULIC ANTI-SKID DEVICE

BACKGROUND OF THE INVENTION

The present invention relates generally to a hydraulic anti-skid device for use in a hydraulic braking system of a vehicle.

As is well known in the art, a hydraulic anti-skid device of this type is usually provided in a passageway supplying a hydraulic fluid pressure from a master cylinder to brake units such as wheel cylinders and controls the supply of the hydraulic fluid pressure to the brake units in response to, for example, an electronic signal and a hydraulic fluid pressure which is produced based on the pump pressure of a pump by a regulator valve.

In the event of braking of a vehicle being effected by depressing a brake pedal thereof, when it is unnecessary to reduce the hydraulic fluid pressure fed to the brake unit as when the deceleration of the vehicle is not excessively great, the anti-skid device allows the hydraulic fluid pressure from the master cylinder to pass to the brake units. Conversely, when it is necessary to reduce the hydraulic fluid pressure fed to the brake units as when the deceleration of the vehicle is excessively great, a predetermined electronic signal is generated and the anti-skid device prevents the hydraulic fluid pressure from the master cylinder from being fed to the brake units and simultaneously reduces the pressure prevailing in said brake units.

Also, when the hydraulic fluid pressure from the pump is not fed because of any trouble, the anti-skid devices provides communication between the master cylinder and the brake units irrespective of the presence and absence of the electronic signal. Such a hydraulic anti-skid device is in detail described later in connection with FIG. 1 of the accompanying drawings.

It is, therefore, an object of the invention to provide a hydraulic anti-skid device for a hydraulic braking system of a vehicle, which is capable of purging air in the braking pressure circuit of the anti-skid device without running the engine of the vehicle and without providing the anti-skid device with means for purging air, and which is capable of feeding the braking pressure from the master cylinder to a brake unit to ensure the braking operation when the hydraulic fluid pressure is not generated by the pump without providing a bypass valve and a differential valve provided in a conventional device so that the anti-skid device is simplified in construction and is reduced in size and weight.

This object is accomplished by providing locking means for locking the expansion valve of the anti-skid device in a position in which the expansion valve provides communication between the master cylinder and a brake unit when the engine does not run or hydraulic fluid pressure is not generated by the pump so as to have the expansion valve perform the function of the bypass valve and the differential valve of the conventional device as well as the function inherent in the expansion valve.

BRIEF DESCRIPTION OF THE DRAWINGS

In the accompanying drawings:

FIG. 1 is a cross sectional schematic view of a prior art hydraulic anti-skid device and FIG. 2 is a cross sectional schematic view of a preferred embodiment of a hydraulic anti-skid device according to the invention.

DESCRIPTION OF THE DRAWINGS

Figure 1:
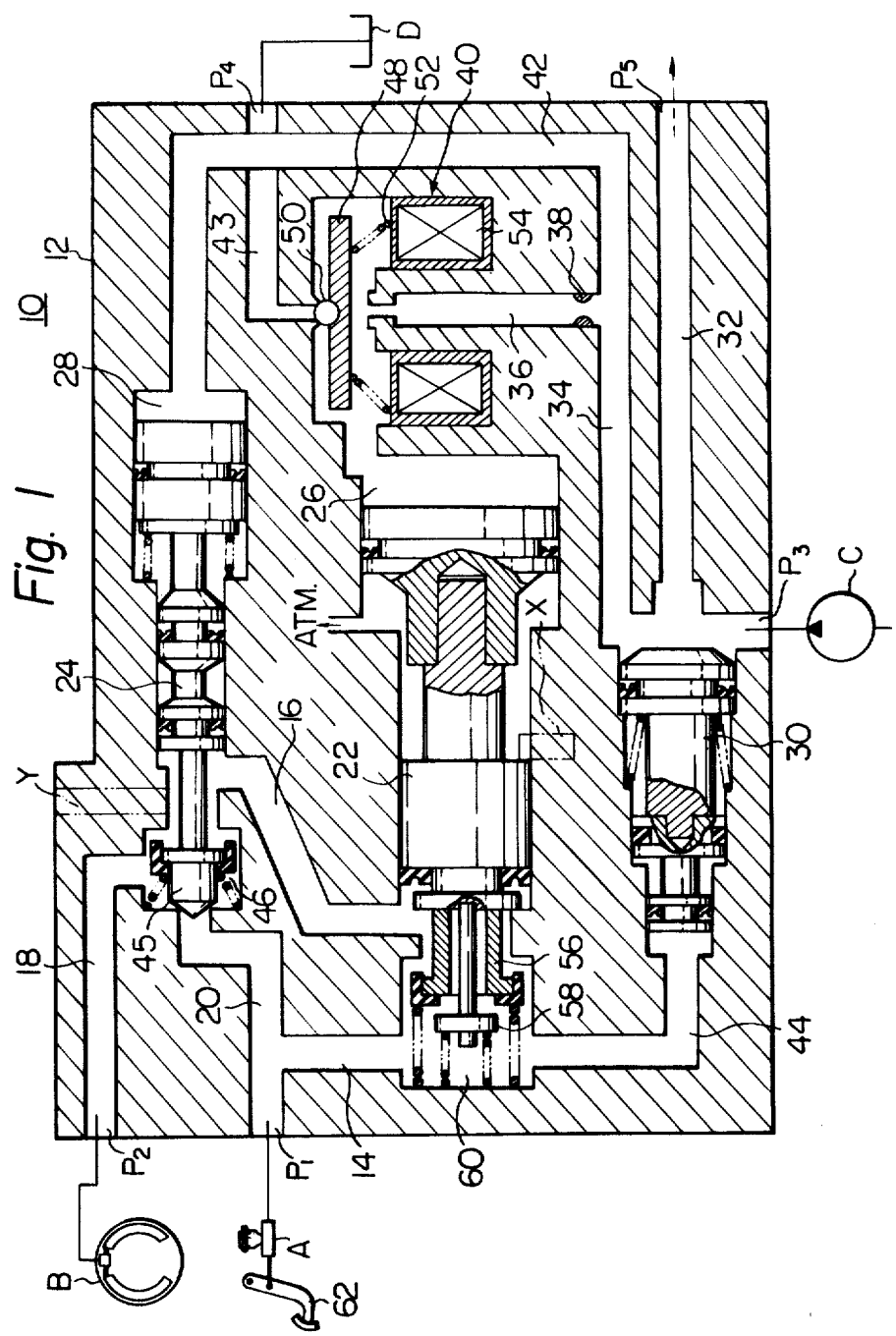

Before entering into the description of the preferred embodiment of the invention, a prior art hydraulic anti-skid device will be described now in connection with FIG. 1.

As shown in FIG. 1, a hydraulic anti-skid device 10 includes a control block 12 formed with ports $P_1$, $P_2$, $P_3$, $P_4$ and $P_5$. The port $P_1$ is connected to a master cylinder A, the port $P_2$ is connected to brake units B (only one is shown), the port $P_3$ is connected to a pump C, the port $P_4$ is connected to a reservoir tank D, and the port $P_5$ is connected to a power steering system (not shown) which is not directly related to the anti-skid device.

The port $P_1$ is communicable with the port $P_2$ through passages 14, 16 and 18 and alternatively through a passage 20 and the passage 18. An expansion valve 22 is disposed so as to control communication between the passages 14 and 16 and a bypass valve 24 is disposed so as to control communication between the passage 18 and both the passages 16 and 20. The expansion valve 22 is exposed to a chamber 26, while the bypass valve 24 is exposed to a chamber 28.

The port $P_3$ communicates on the one hand with the port $P_5$ through a regulator valve 30 and a passage 32 and on the other hand with the chamber 26 through the regulator valve 30, a passage 34 and a passage 36. The passage 36 has therein an orifice 38. An electromagnetically operated armature valve 40 is provided for opening and closing the passage 36. The passage 34 is branched off to a passage 42 which communicates with the chamber 28. The port $P_4$ is communicable with the chamber 26 through a passage 43.

The regulator valve 30 regulates the hydraulic fluid pressure, fed from the pump C into the passages 32 and 34, in accordance with the hydraulic fluid pressure fed from the master cylinder A into a passage 44 which communicates with the passage 14.

When the fluid pressure is fed in the chamber 28, the bypass valve 24 is forced into a left-hand position shown in FIG. 1 so that a differential valve 45 integral with the bypass valve 24 obstructs communication between the passages 18 and 20 and provides communication between the passages 16 and 18 through a chamber 46. When the fluid pressure is not fed in the chamber 28, the bypass valve 24 is pushed into a righthand position in the drawing in which it provides communication between the passages 18 and 20 through the chamber 46 and obstructs communication between the passages 16 and 18. The bypass and differential valves 24 and 45 functions as a safety valve for ensuring braking operation when a malfunction or trouble occurs in the pump C and/or the passage 34, 36 or 42.

The armature valve 40 includes an armature 48 provided with an armature ball 50 which normally closes the passage 43. A spring 52 urges the armature 48 into a position shown in FIG. 1 in which passage 43 is closed. A solenoid coil 54, when energized, attracts the armature 48 and opens the passage 43. When the armature ball 50 closes the passage 43, the fluid pressure is fed into the chamber 26 through the passage 36, while when the solenoid coil 54, is energized, the armature 48 obstructs communication between the chamber 26 and the passage 36. The solenoid coil 54 is electrically connected to an electronic control circuit (not shown) to receive therefrom an output signal for energizing the solenoid coil 54 when it is necessary to reduce the fluid pressure applied to the brake units B as when the deceleration of the vehicle has been excessively increased.

The expansion valve 22 is pushed by the fluid pressure in chamber 26 into a left-hand position shown in FIG. 1 in which check valves 56 and 58 are opened to provide communication between the passages 14 and 16 through a chamber 60. The expansion valve 22 is, when the fluid pressure does not exist in the chamber 26, moved in a right-hand position closing the check valves 56 and 58 to obstruct communication between the passages 14 and 16.

The anti-skid device 10 thus described is operated as follows:

1. Normal operation (when a malfunction does not occur anywhere in the anti-skid device 10 and the pump C).

(1) When the brake pedal 62 of the vehicle is not depressed, the expansion and bypass valves 22 and 24 are moved respectively into the left-hand positions shown in FIG. 1 with the control pressure from the pump C acting on the valves. As a result, the expansion valve 22 provides communication between the passages 14 and 16 and the bypass valve 24 obstructs communication between the passages 18 and 20. Regulator valve 30 is moved into a left-hand position in the drawing with the fluid pressure from the pump C acting on the valve 30 on its right side.

(2) When the brake pedal 62 is depressed so that the fluid pressure is fed from the master cylinder A into the chambers 60 and 46 and the passage 44 and is increased, the fluid pressures increase the forces urging the valves 22, 24 and 30 rightwards. In this instance, the regulator valve 30 is moved some amount rightwards so that the fluid pressure in the passage 34 is increased by an orifice effect. In this state, the regulator valve 30 is balanced. In the case of the bypass valve 24, although the fluid pressures act respectively on the right and left sides of the valve 24, since the force pushing the valve 24 leftwards is greater than the force pushing the valve 24 rightwards, the bypass valve 24 is held in the left-hand position so that it obstructs communication between the passages 18 and 20.

In the case of the expansion valve 22, since the solenoid coil 54 is not energized (a signal for reducing the braking pressure is not generated) the ball 50 closes the passage 43. As a result, the fluid pressure is fed from the passage 34 into the chamber 26 to push the expansion valve 22 and the check valves 56 and 58 leftwards. Since the force pushing the valves 22, 56 and 58 leftwards is greater than the force pushing the expansion valve 22 rightwards due to a relatively large area of the valve 22 in the chamber 26, the expansion valve 22 is held in the left-hand position shown in the drawing.

Accordingly, the fluid pressure $P_A$ from the master cylinder A is conducted into the wheel cylinder B by way of the passages 14, 16 and 18 and the chambers 60 and 46.

(3) The event of the signal for reducing the braking pressure being generated.

When the braking pressure $P_B$ is increased and the deceleration of the vehicle exceeds a predetermined value, the solenoid coil 54 is fed with an electric current generated in and controlled by a computer circuit in a module (not shown). When the solenoid coil 54 is energized, the armature 48 is moved to open the passage 43. As a result, the fluid in the chamber 26 acting on the right side of the expansion valve 22 is returned to the reservoir D through the port $P_4$ so that the pressure in said chamber is reduced to zero and the expansion valve 22 is pushed rightwards by the braking pressure acting on the left side of the valve 22 to obstruct communication between the passages 14 and 16. Accordingly, the hydraulic fluid confined in the piping interconnecting the anti skid device and the wheel cylinders B expands by the volume increased caused by the rightward movement of the expansion valve 22 to reduce the fluid pressure in the piping. Accordingly, the braking force is removed or reduced so that skid is prevented. The bypass and regulator valves 24 and 30 are both held in the same positions as those in the case of (2) mentioned above.

2. The event of a malfunction occurring in the pressurized hydraulic fluid circuit including the pump C, the piping such as the passages 32, 34, 36 and 42, and so on.

In this instance, since the fluid pressure in the circuit is reduced to zero, the expansion, bypass and regulator valves 22, 24 and 30 are all moved by the braking pressure into their right-hand positions, respectively, in the drawing. As a result, the bypass valve 24 obstructs communication between the passages 16 and 18 and provides communication between the passages 20 and 18 through the chamber 47 to directly connect the master cylinder A and the brake units B. Accordingly, in spite of the malfunction of the pressurized hydraulic fluid circuit, the braking operation is made possible to assure the safety of the vehicle. However, in this instance, even if the signal for reducing the braking pressure is generated, a skid control operation is not provided.

In the conventional anti-skid device 10 stated above, it is impossible to extract or remove air from the braking pressure circuit when the vehicle engine does not run. Since the operation of the pump C is stopped concurrently with the stop of running of the engine so that the fluid pressure is not fed into the chambers 26 and 28, the expansion and bypass valves 22 and 24 are both moved, by the fluid pressure from the master cylinder A, into the right-hand positions in which the check valves 56 and 58 and the bypass valve 24 close the passage 16 to separate same from the braking pressure circuit. As a result, it is impossible to remove air in the passage 16. Accordingly, it is necessary to purge air in the passage 16 by running the engine to drive the pump C and moving the bypass and expansion valves 24 and 22 into the lefthand positions. This requires measures for securing the safety of the operator to be taken. For performing hazard free air removal without degrading the safety of the operator, it has been proposed to provide at the location designated by the reference X in FIG. 1 stop means for preventing movement of the expansion valve 22 rightwards for keeping the check valves 56 and 58 open when the engine does not run and to provide at the location designated by the reference Y in FIG. 1 an air bleeder for removing air, however the construction has accordingly become extremely complicated.

Furthermore, for the purpose of maintaining the braking operation even when a malfunction occurs in the pressurized hydraulic fluid circuit including the pump C, the piping, and so on, although the conventional anti-skid device 10 is provided with the bypass valve 24 and the differential valve 45 to assure the safety of the vehicle as mentioned hereinbefore, this causes even further complication of the anti-skid device 10.

DESCRIPTION OF THE PREFERRED EMBODIMENT

Referring to FIG. 2 of the drawings, there is shown a hydraulic anti-skid device according to the invention. The hydraulic anti-skid device, generally designated by the reference numeral 70, is shown to be combined with a hydraulic braking system for a vehicle, including a master cylinder A and brake units B such as wheel cylinders only one of which is shown, a pump C and a reservoir D. The anti-skid device 70 comprises a block or housing 72 formed with ports $P_1'$, $P_2'$, $P_3'$ and $P_4'$, and an expansion valve 74 which is slidably fitted in a bore formed in the housing 72 and is formed therein with a cavity 76. The expansion valve 74 has an expansion piston 78 which is slidably fitted in both the cavity 76 of the expansion valve 74 and a bore 80 formed in the housing 72. The expansion piston 78 has around an intermediate portion thereof in the bore 80 a chamber which allows movements of the expansion valve and piston 74 and 78 toward each other and communicates with the atmosphere. The expansion piston 78 also has on a right side thereof in the drawing a chamber 82 which is communicable with the port $P_3'$ through passages 84, 86 and 88. The passage 86 has one or more orifices therein similarly to the passage 36 shown in FIG. 1. The port $P_3'$ communicates with the pump C to receive hydraulic fluid pressure generated by the pump C. The chamber 82 is also communicable with the port $P_4'$ which in turn communicates with the reservoir D. The expansion valve 74 has on a left side thereof in the drawing a chamber 92 which communicates at all times with the port $P_2'$ through a passage 94 irrespective of the operating positions of the expansion valve 74. The port $P_2'$ communicates with the brake units B. The chamber 92 is communicable with a passage 96 which communicates at all times with the port $P_1'$. The port $P_1'$ communicates with the master cylinder A. A spring 100 is provided to urge the expansion valve and piston 74 and 78 away from each other. The strength of the spring 100 is selected so as to, when the chamber 92 is not fed with a hydraulic fluid pressure from the master cylinder A and the chamber 82 is not fed with the hydraulic fluid pressure from the pump C, hold the valve 74 and the piston 78 in positions shown in the drawing and so that, when at least one of the chambers 82 and 92 is fed with the fluid pressure, one of the valve 74 and the piston 78 is moved by the fluid pressure toward the other of the valve 74 and the piston 78.

The expansion valve 74 has at a left end thereof in the drawing a check valve 102 which comprises an inner valve 104 fixedly secured to the left end of the valve 74 and an outer valve 106 with and from which each of the valve 74 and the inner valve 104 is engageable and disengageable. The expansion valve 74 has an open position as shown in the drawing in which the check valve 102 is opened to provide communication between the chamber 92 and the passage 96 with the inner valve 104 disengaging from the outer valve 106 and the outer valve 106 disengaging from a valve seat. The expansion valve 74 is moved by the fluid pressure in the chamber 92 into a right-hand position in the drawing or a closed position in which the check valve 102 is closed to obstruct communcation between the chamber 92 and the passage 96 with the inner valve 104 engaging against the outer valve 106 and the outer valve 106 engaging against the valve seat. A spring 107 is provided to urge the outer valve 104 and the expansion valve 74 toward the expansion piston 78.

The expansion valve 74 is formed at an external circumferential wall surface thereof with an annular groove 108. Locking means 110 is provided which prevents the expansion valve 74 from being moved by the fluid pressure in the chamber 92 into the right-hand position or the closed position and locks the expansion valve 74 in an open position such as, for example, the open position shown in the drawing. The locking means 110 comprises a piston 112 slidably fitted in a cylindrical bore 114 formed in the housing 72. The piston 112 has a projection or rod 116 fixedly secured thereto and serving as stop means which protrudes into the groove 108 of the expansion valve 74 in the open position and engages in the groove 108 to prevent the expansion valve 74 from being moved rightwards. A spring 118 provided to urge the piston 112 and the projection 116 into a protruded position in which the projection 116 is engaged in the groove 108. The cylinder 114 has an open end which is closed by an end plug or a bolt 120. A chamber 122 is defined between the piston 112 and an internal end wall surface of the bolt 120, while a chamber 124 is defined between the piston 112 and an internal wall surface of the cylinder 114. The chamber 122 communicates with the atmosphere. The chamber 124 communicates with the passage 88 through a passage 126. A seal 128 is provided to seal the chamber 124 from a bore of the housing 72 in which bore the projection 116 is slidably fitted. A seal 130 is provided to seal the chambers 122 and 124 from each other. A seal 132 is provided to seal the chamber 122 from a portion of the cylinder 114 with an internal wall surface of which portion the bolt 120 engages.

A regulator valve 134 similar to the regulator valve 30 shown in and described with respect to FIG. 1 is provided in the passage 88 and has a portion thereof exposed to the fluid pressure from the master cylinder A (although not shown) so that the fluid pressure fed from the pump C into the passages 86 and 126 is adjusted in accordance with the fluid pressure fed from the master cylinder A.

An electromagnetically operated armature valve 136 similar to the armature valve 40 shown in and described with respect to FIG. 1 is provided to provide communication between the passages 84 and 86 and obstruct communication between the passages 84 and 90 when a solenoid coil (not shown) of the valve 136 is not energized and to obstruct communication between the passages 84 and 86 and to provide communication between the passages 84 and 90 when the solenoid is energized.

The anti-skid device 70 thus described is operated as follows:

1. Normal operation.

(1) When the master cylinder A is not operated.

The fluid pressure from the pump C is fed into the chambers 82 and 124 through the passages 86 and 126. As a result, the piston 112 is pushed by the fluid pressure in the chamber 124 into a lower position in the drawing or a retracted or rest position in which the projection 116 is disengaged from the groove 108, while the expansion valve 74 and the expansion piston 78 are moved into a left-hand position in the drawing or an open position in which the outer and inner valves 104 and 106 are both opened to provide communication between the chamber 92 and the passage 96.

(2) When the master cylinder A is operated (when the braking operation is performed).

Although the fluid pressure is fed from the master cylinder A into the chamber 92 through the passage 96, the expansion valve 74 remains in the left-hand position since the force pushing the expansion piston 78 leftwards is greater than the force pushing the expansion piston 78 rightwards due to the operation of the regulator valve 134. Accordingly, since the check valve 102 remains opened, the fluid pressure from the master cylinder A is fed into the brake unit B through the passage 94 and the port $P_2'$. As a result, the brake units B are operated to perform the braking operation.

(3) The event of a signal for reducing the braking pressure being generated.

A predetermined signal is applied to the solenoid of the armature valve 136 to energize the solenoid. An armature of the valve 136 is moved by energization of the solenoid to provide communication between the passage 84 and the reservoir D. Accordingly, the fluid pressure in the chamber 82 is reduced to zero so that the expansion valve 74 is moved by the fluid pressure in the chamber 92 into the right-hand position or the closed position in which the check valves 104 and 106 are closed to isolate the brake units B from the master cylinder A. At this time, since the fluid pressure in the brake units B are reduced by a volume corresponding to the displacement of the expansion valve 74 moved rightwards, the braking force is reduced to prevent skidding. In this instance, since the fluid pressure is continuously fed into the chamber 124, the piston 112 is held in the rest position to make movement of the expansion valve 74 into the right-hand position possible.

2. When the piping from the pump C to the anti-skid device 70 is in an abnormal condition.

When the fluid pressure is not fed into the port $P_3'$ due to stoppage of the engine of the vehicle, failure of the piping of the pump C, and so on, the fluid pressure in the chamber 124 is reduced to cause the force of the spring 118 to quickly move the piston 112 upwards in the drawing to engage the projection 116 into the groove 108. As a result, the expansion valve 74 is prevented by the stop means 110 from being moved rightwards in spite of a reduction in the fluid pressure in the chamber 82 to keep the check valves 104 and 106 open. Accordingly, although the function of preventing skid is lost, the fluid pressure from the master cylinder A is conducted into the brake units B to assure the braking operation. Therefore, the expansion valve 74 concurrently accomplishes the function of the conventional bypass and differential valves 24 and 45 described hereinbefore and shown in FIG. 1.

·3. Air removing operation.

The anti-skid device 70 presents the same condition as that in the event of 2 mentioned above by stopping the operation of the engine. Accordingly, it is possible to remove air even when the engine does not run by using the air bleeder provided in the braking pressure circuit. As a result, the safety of the operator is assured.

Although the invention has been described such that the stop means 116 engages in the groove 108 formed in the expansion valve 74, the anti-skid device 70 can be modified such that the stop means 116 engages against a right end surface of the expansion valve 74 to prevent same from being moved rightwards in place of providing the groove 108.

It will be thus appreciated that the invention provides a hydraulic anti-skid device which comprises locking means for locking the expansion valve in a position in which the expansion valve provides communication between the master cylinder and a brake unit when a hydraulic fluid pressure is not generated by the pump, so that it is possible to purge air in the braking pressure circuit of the anti-skid device without running the engine and without providing the anti-skid device with means for purging air, and the braking operation is ensured even when the hydraulic fluid pressure is not generated by the pump without providing a bypass valve and a differential valve, and furthermore the anti-skid device is simplified in construction and is reduced in size and weight by omission of the bypass valve and the differential valve.

What is claimed is:

1. A hydraulic anti-skid device for a hydraulic braking system, comprising
   a pump for feeding a hydraulic fluid pressure into said anti-skid device,
   first passage means for receiving a braking pressure,
   second passage means communicable with said first passage means for allowing the braking pressure to be discharged from said anti-skid device,
   an expansion valve operably disposed for controlling communication between said first and second passage means,
   said expansion valve having a first position in which it provides said communication and a second position in which it obstructs said communication and reduces the braking pressure in said second passage means,
   third means for causing said expansion valve to assume said first position when it is unnecessary to reduce the braking pressure in said second passage means and for causing said expansion valve to assume said second position when it is necessary to reduce the braking pressure in said second passage means, locking means which, when said anti-skid device is fed with said hydraulic fluid pressure from said pump, permits movement of said expansion valve from said first position into said second position and which, when said anti-skid device is not fed with said hydraulic fluid pressure from said pump, locks said expansion valve in said first position,
   said expansion valve being formed with a groove,
   said locking means comprising stop means engaged in said groove by biasing means when said anti-skid device is not fed with said hydraulic fluid pressure from said pump and disengaged from said groove by said hydraulic fluid pressure from said pump when said anti-skid device is fed with said hydraulic fluid pressure from said pump.

2. A hydraulic anti-skid device as claimed in claim 1, in which said stop means comprises
   means defining a cylindrical cavity,
   a piston slidably fitted in said cylindrical cavity and defining on a side thereof in said cylindrical cavity
   a chamber which communicates with said pump for receiving the hydraulic fluid pressure therefrom and is located so that said piston is moved away from said expansion valve by the hydraulic fluid pressure in said chamber when said chamber receives the hydraulic fluid pressure from said pump and toward said expansion valve by the force of said biasing means when said chamber does not receive the hydraulic fluid pressure from said pump; and
   a projection extending from said piston toward said expansion valve and engaged in said groove when said piston is moved toward said expansion valve and disengaged from said groove when said piston is moved away from said expansion valve.

* * * * *